United States Patent
Lee et al.

(10) Patent No.: US 10,677,349 B2
(45) Date of Patent: Jun. 9, 2020

(54) PRESSURE REGULATION VALVE CONTROL DEVICE

(71) Applicant: JATCO Ltd, Fuji-shi, Shizuoka (JP)

(72) Inventors: Soyoung Lee, Gwangmyeong-si (KR); Hajime Tasaka, Seoul (KR); Kokan Boku, Sagamihara (JP); Kosuke Abe, Isehara (JP); Tomoyuki Suwabe, Okazaki (JP)

(73) Assignee: JATCO LTD, Fuji-Shi (JP)

( * ) Notice: Subject to any disclaimer, the term of this patent is extended or adjusted under 35 U.S.C. 154(b) by 0 days.

(21) Appl. No.: 16/319,045

(22) PCT Filed: Jul. 19, 2017

(86) PCT No.: PCT/JP2017/026064
§ 371 (c)(1),
(2) Date: Jan. 18, 2019

(87) PCT Pub. No.: WO2018/016518
PCT Pub. Date: Jan. 25, 2018

(65) Prior Publication Data
US 2020/0025289 A1    Jan. 23, 2020

(30) Foreign Application Priority Data
Jul. 19, 2016 (JP) .................. 2016-141248

(51) Int. Cl.
*F16H 61/00* (2006.01)
*F16H 61/02* (2006.01)
(Continued)

(52) U.S. Cl.
CPC ..... *F16H 61/0251* (2013.01); *F16H 61/0276* (2013.01); *F16H 61/12* (2013.01);
(Continued)

(58) Field of Classification Search
CPC ............. F16H 61/0251; F16H 61/0276; F16H 2061/1264; F16H 2061/0043; F16H 61/662; F16H 61/12; F16K 31/06
See application file for complete search history.

(56) References Cited

U.S. PATENT DOCUMENTS

2004/0254706 A1* 12/2004 Shim ................... F16H 61/0251
                                                          701/51
2009/0229673 A1    9/2009 Tabuchi et al.
(Continued)

FOREIGN PATENT DOCUMENTS

JP    2009-216228 A    9/2009

*Primary Examiner* — David J Hlavka
(74) *Attorney, Agent, or Firm* — Foley & Lardner LLP

(57) ABSTRACT

Pressure regulation valve control device has line pressure regulation valve (4) having line pressure solenoid (41) and line pressure spool valve (42) and CVT control unit (8) controlling secondary pressure (Psec) by actuating the line pressure spool valve (42) by solenoid pressure (Psol) produced by controlling current command value (I) to the line pressure solenoid (41). CVT control unit (8) has abnormality control unit (81). The abnormality control unit (81) is configured to, when decrease in secondary pressure (Psec) is detected during travel, execute, during travel, abnormality control that increases solenoid pressure (Psol) supplied to line pressure spool valve (42) from line pressure solenoid (41), more than solenoid pressure (Psol) of a time when the decrease in secondary pressure (Psec) is detected. With this, even when the decrease in the pressure is detected during travel, the decrease in the pressure is suppressed during travel while reducing influence on vehicle travel.

8 Claims, 6 Drawing Sheets

(51) Int. Cl.
*F16H 61/12* (2010.01)
*F16H 61/662* (2006.01)

(52) U.S. Cl.
CPC .... *F16H 61/662* (2013.01); *F16H 2061/0043* (2013.01); *F16H 2061/1264* (2013.01)

(56) References Cited

U.S. PATENT DOCUMENTS

2016/0327154 A1\* 11/2016 Kutsubo ................ F16H 61/12
2017/0248225 A1\* 8/2017 Igarashi ............. F16H 61/0025

\* cited by examiner

PRESSURE REGULATION VALVE CONTROL DEVICE

The present invention relates to a pressure regulation valve control device provided with a pressure regulation valve having a solenoid and a spool valve.

BACKGROUND ART

There has been known a pressure regulation valve in a control device of a vehicle, which regulates or controls an oil pressure supplied to a clutch. When decrease in a clutch pressure (the oil pressure) controlled by this pressure regulation valve is detected during travel or during vehicle stop, the control device of the vehicle changes a command pressure (a signal pressure) to the pressure regulation valve from the solenoid and moves the spool valve provided inside the pressure regulation valve (a foreign matter removal control) in a vehicle stop state (during the vehicle stop). With this operation, it is possible to drain or remove contamination trapped in the pressure regulation valve (see, for instance, Patent Document 1).

In the conventional control device of the vehicle, however, since the contamination is drained in the vehicle stop state by moving the spool valve, for instance, in a case where the clutch pressure decreases due to the trap of the contamination in the pressure regulation valve during the travel, the decrease in the clutch pressure during the travel cannot be prevented during the travel. On the other hand, if the conventional foreign matter removal control is carried out during the travel, for instance, in a case where the spool valve is moved to a side where a discharge pressure of the pressure regulation valve is decreased, an oil pressure at a downstream side with respect to the pressure regulation valve is decreased, and this affects a vehicle travelling state, such as insufficient oil pressure supply to the clutch or a belt etc. As described above, the conventional control device of the vehicle has a problem of not being able to prevent the decrease in the clutch pressure during the travel without affecting the vehicle travelling state when the clutch pressure decreases during the travel.

CITATION LIST

Patent Document

Patent Document 1: Japanese Unexamined Patent Application Publication No. JP2009-216228

SUMMARY OF THE INVENTION

The present invention was made in view of the above problem. An object of the present invention is therefore to provide a pressure regulation valve control device that is capable of suppressing the decrease in the oil pressure during the travel while reducing the influence on the vehicle travel even in the case where the decrease in the oil pressure is detected during the travel.

To achieve the object, the present invention has a pressure regulation valve and a controller. The pressure regulation valve has a solenoid and a spool valve. The controller is configured to control an oil pressure by actuating the spool valve by a command pressure that is produced by controlling a current command value to the solenoid. The controller has an abnormality control unit in a pressure regulation valve control device. The abnormality control unit is configured to, when decrease in the oil pressure is detected during travel, execute, during the travel, abnormality control that increases the command pressure supplied to the spool valve from the solenoid more than a command pressure of a time when the decrease in the oil pressure is detected.

Therefore, when decrease in the oil pressure is detected during travel, the abnormality control that increases the command pressure supplied to the spool valve from the solenoid more than a command pressure of a time when the decrease in the oil pressure is detected is executed during the travel. That is, even in the case where the decrease in the oil pressure is detected during the travel, since the command pressure is increased, during the travel, more than a command pressure of a time when the decrease in the oil pressure is detected, the spool valve is moved in one direction. Since the oil pressure is increased by this operation or movement, it is possible to suppress decrease in an oil pressure at a downstream side with respect to the pressure regulation valve. This thus suppresses an influence on the vehicle travelling state which is caused by the decrease in the oil pressure (in other portion or unit. Consequently, even when the decrease in the oil pressure is detected during the travel, the decrease in the oil pressure is suppressed during the travel while reducing the influence on the vehicle travel.

EMBODIMENTS FOR CARRYING OUT THE INVENTION

Figure 1:
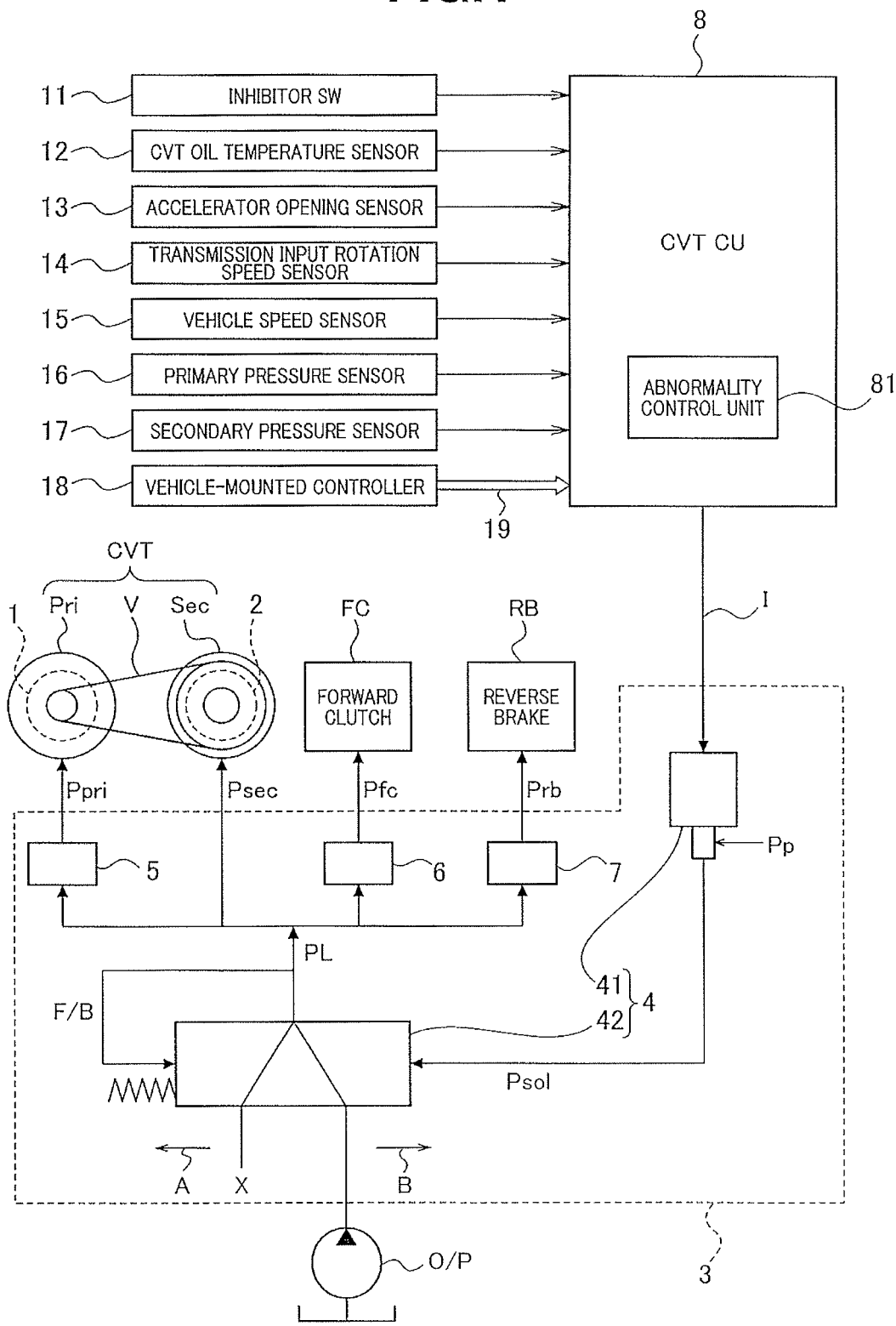
FIG. 1 is a block diagram showing a belt-type continuously variable transmission having a hydraulic pressure control valve unit to which a pressure regulation valve control device of an embodiment 1 is applied.

In the following description, a best mode for realizing a pressure regulation valve control device according to the present invention will be explained on the basis of an embodiment 1 shown in the drawings.

Embodiment 1

First, a configuration will be explained. A pressure regulation valve control device according to the embodiment 1 is a device applied to a belt-type continuously variable transmission having a hydraulic pressure control valve unit. Here, the belt-type continuously variable transmission is mounted in a vehicle such as an engine vehicle and a hybrid vehicle. The configuration of the control device of the embodiment 1 will be separately explained below by [General configuration] and [ Configuration of abnormality control operation].

[General Configuration]

FIG. 1 shows a block diagram of the belt-type continuously variable transmission having the hydraulic pressure control valve unit to which the pressure regulation valve control device of the embodiment 1 is applied. In the following description, a general configuration of the belt-type continuously variable transmission having the hydraulic pressure control valve unit will be explained on the basis of FIG. 1.

The belt-type continuously variable transmission CVT has a forward clutch FC, a reverse brake RB, the hydraulic pressure control valve unit 3, an oil pump O/P (an oil supply source) and a CVT control unit 8 (CVT CU, a controller).

The belt-type continuously variable transmission CVT is a belt-type continuously variable transmission having a primary pulley Pri, a secondary pulley Sec and a pulley belt V wound around both the primary pulley Pri and the secondary pulley Sec. The primary pulley Pri and the secondary pulley Sec change their respective pulley widths while sandwiching the pulley belt V by oil supply to a primary pressure chamber 1 and a secondary pressure chamber 2, and continuously change or vary a transmission ratio (a pulley ratio) by changing or varying radii of surfaces sandwiching the pulley belt V.

The forward clutch FC and the reverse brake RB are frictional engagement elements. The forward clutch FC and the reverse brake RB in the present embodiment are formed by a hydraulically operated wet multiple disc frictional clutch and a hydraulically operated wet multiple disc frictional brake respectively. At a forward travel, the forward clutch FC is engaged, whereas at a reverse travel, the reverse brake RB is engaged.

The hydraulic pressure control valve unit 3 produces a control pressure on the basis of a control command from the CVT control unit 8. The belt-type continuously variable transmission CVT, the forward clutch FC and the reverse brake RB etc. are controlled by this control pressure. The hydraulic pressure control valve unit 3 has a line pressure regulation valve 4 (a pressure regulation valve), a primary pressure regulation valve 5, a forward clutch pressure regulation valve 6 and a reverse brake pressure regulation valve 7.

The line pressure regulation valve 4 regulates a line pressure PL supplied to the belt-type continuously variable transmission CVT, the forward clutch FC and the reverse brake RB on the basis of a pump discharge pressure from the oil pump O/P. In the embodiment 1, since a secondary pressure regulation valve is not provided, the line pressure PL is the same pressure as a secondary pressure Psec. Because of this, a pressure regulation system of the embodiment 1 is a single pressure regulation system in which the secondary pressure Psec is the line pressure PL. The line pressure regulation valve 4 has a line pressure solenoid 41 (a solenoid) and a line pressure spool valve 42 (a spool valve).

The line pressure solenoid 41 produces a solenoid pressure Psol (a command pressure, a signal pressure) to the line pressure spool valve 42 by application of current with a pilot pressure Pp (a constant pressure) being an initial pressure. The current applied to the line pressure solenoid 41 is based on a current command value I from the CVT control unit 8. The line pressure spool valve 42 is operated or actuated by this solenoid pressure Psol. Regarding the solenoid pressure Psol, the smaller the current command value I applied to the line pressure solenoid 41 is, the greater the solenoid pressure Psol is, and the greater the current command value I applied to the line pressure solenoid 41 is, the smaller the solenoid pressure Psol is. That is, when an output of the current command value I is a minimum, the solenoid pressure Psol is a maximum, and when the output of the current command value I is a maximum, the solenoid pressure Psol is a minimum.

The line pressure spool valve 42 is operated or actuated by or according to the solenoid pressure Psol, and regulates the line pressure PL. The solenoid pressure Psol acts on one end side of the line pressure spool valve 42, and a spring force and a PL feedback pressure F/B (a feedback pressure of a regulated line pressure) act on the other end side of the line pressure spool valve 42. When the solenoid pressure Psol is changed and a force from the one end side of the line pressure spool valve 42 is greater than a force from the other end side of the line pressure spool valve 42, the line pressure spool valve 42 moves in an A direction (in one direction, in a direction in which the oil pressure is increased). With this operation or movement, the line pressure PL is increased. On the other hand, when the solenoid pressure Psol is changed and the force from the other end side of the line pressure spool valve 42 is greater than the force from the one end side of the line pressure spool valve 42, the line pressure spool valve 42 moves in a B direction (in an opposite direction, in a direction in which the oil pressure is decreased) that is opposite to the A direction. A redundant oil is thus drained. With this operation or movement, the line pressure PL is decreased. The line pressure PL is regulated by such movement of the line pressure spool valve 42.

The primary pressure regulation valve 5 regulates a primary pressure Ppri led to the primary pressure chamber 1 with the line pressure PL being an initial pressure. For instance, when the transmission ratio is a highest transmission ratio, the primary pressure Ppri is the line pressure PL. And, as the transmission ratio shifts to a low transmission ratio side, the primary pressure Ppri becomes a lower transmission pressure.

The forward clutch pressure regulation valve 6 regulates a forward clutch pressure Pfc supplied to the forward clutch FC with the line pressure PL being an initial pressure. For instance, when engaging the forward clutch FC (at a forward travel), the forward clutch pressure Pfc is a high pressure. And, when disengaging the forward clutch FC, the forward clutch pressure Pfc is a low pressure.

The reverse brake pressure regulation valve 7 regulates a reverse brake pressure Prb supplied to the reverse brake RB with the line pressure PL being an initial pressure. For instance, when engaging the reverse brake RB (at a reverse travel), the reverse brake pressure Prb is a high pressure. And, when disengaging the reverse brake RB, the reverse brake pressure Prb is a low pressure.

The CVT control unit 8 performs a transmission ratio control etc. of the belt-type continuously variable transmission CVT. As input sensors to the CVT control unit 8, an inhibitor switch 11, a CVT oil temperature sensor 12, an accelerator opening sensor 13, a CVT input rotation speed sensor 14, a vehicle speed sensor 15, a primary pressure sensor 16, a secondary pressure sensor 17 and so on are provided. Further, information required for the control is inputted to the CVT control unit 8 from other vehicle-mounted controller 18 through a CAN communication line 19. The CVT control unit 8 controls the current command value I to the line pressure solenoid 41 on the basis of these sensor information, and controls the line pressure PL (the oil pressure) by actuating the line pressure spool valve 42 by the solenoid pressure Psol produced by the control of this current command value I. The CVT control unit 8 has an abnormality control unit 81. The abnormality control unit 81 controls the line pressure regulation valve 4 when detecting decrease in the secondary pressure Psec that is inputted from the secondary pressure sensor 17.

[Configuration of Abnormality Control Operation]

Figure 2:
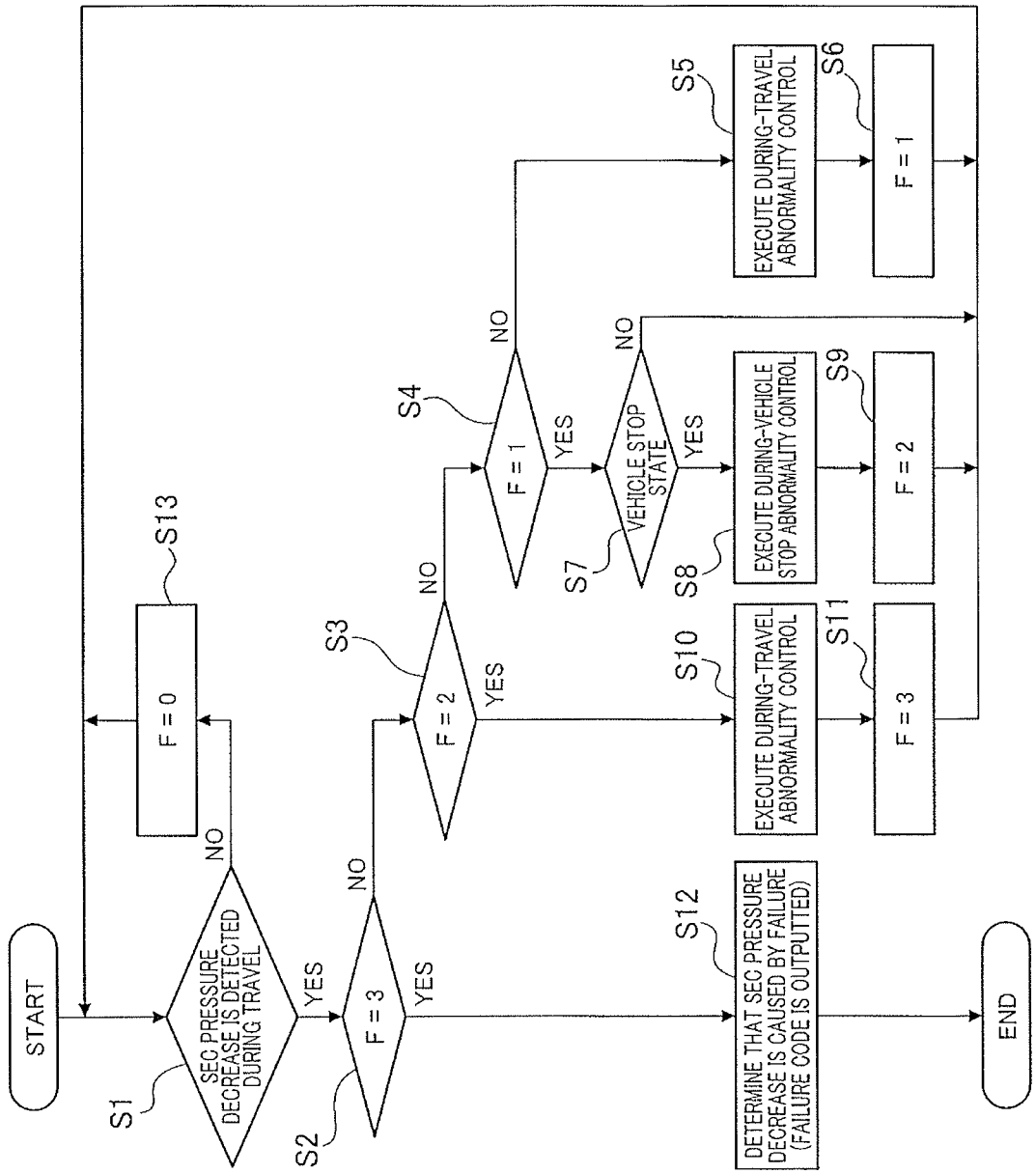
FIG. 2 is a flow chart showing flows of abnormality control operation executed in an abnormality control unit of the embodiment 1 when detecting decrease in a secondary pressure.
Figure 3:
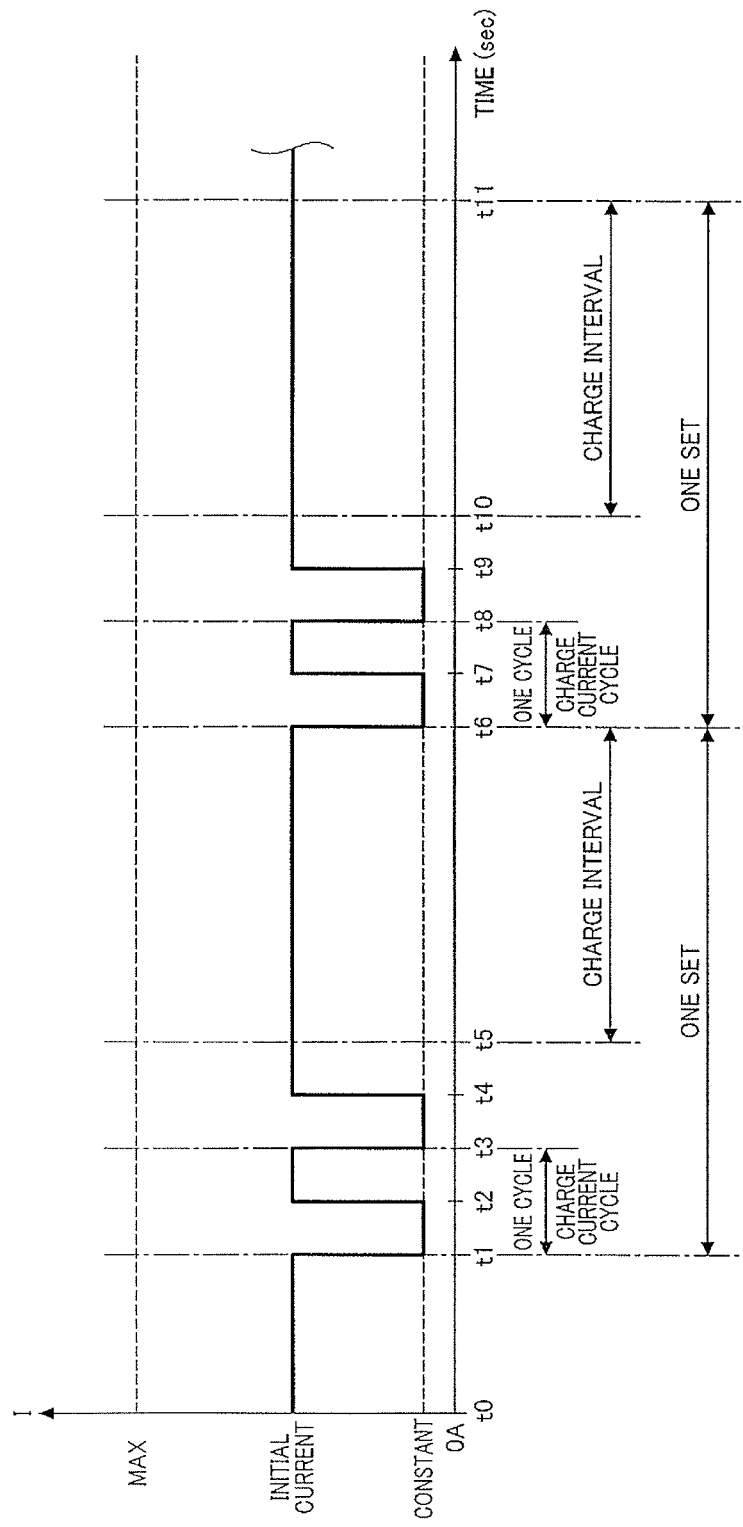
FIG. 3 is a time chart of a during-travel abnormality control of a current command value, executed during travel in the abnormality control unit of the embodiment 1.
Figure 4:
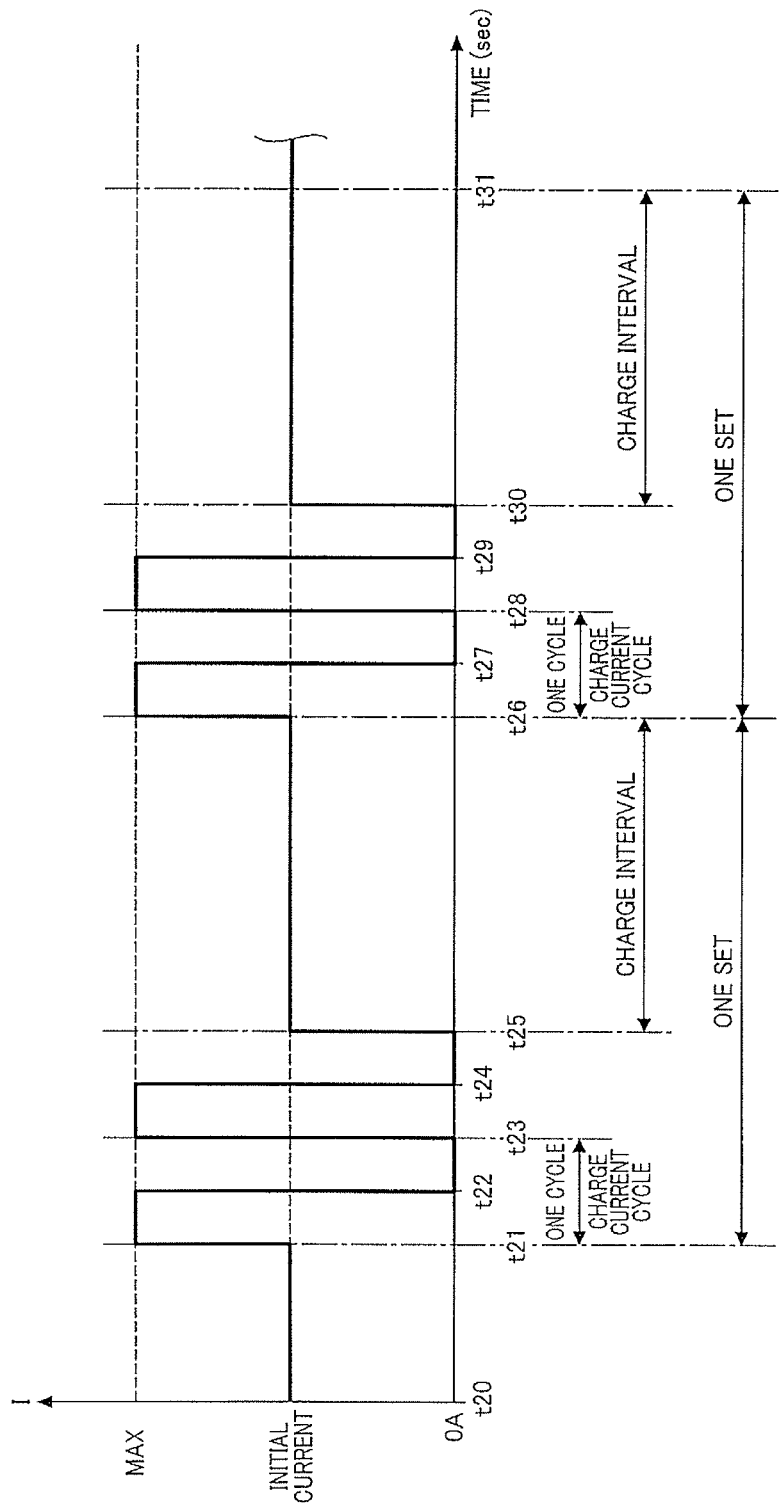
FIG. 4 is a time chart of a during-vehicle stop abnormality control of a current command value, executed during vehicle stop in the abnormality control unit of the embodiment 1.

FIG. 2 is a flowchart showing flows of abnormality control operation executed in the abnormality control unit 81 of the embodiment 1 when detecting decrease in the secondary pressure Psec (an abnormality control operation). FIG. 3 is a time chart of a during-travel abnormality control of the current command value I, executed during travel in the abnormality control unit 81 of the embodiment 1. FIG. 4 is a time chart of a during-vehicle stop abnormality control of the current command value I, executed during vehicle stop in the abnormality control unit 81 of the embodiment 1. In the following description, each step of FIG. 2, showing a configuration of the abnormality control operation when detecting decrease in the secondary pressure Psec, will be explained. This control operation is repeated at a predetermined control cycle period (e.g. 10 msec). Here, in a case where the decrease in the secondary pressure Psec is not detected (at an initial state), a flag (F) is zero (F=0).

At step S1, subsequent to "F=0" at START, a setting of "F=1" at step S6, a judgment of "vehicle is travelling" at step S7, a setting of "F=2" at step S9, a setting of "F=3" at step S11 or a setting of "F=0" at step S13, a judgment is made as to whether or not the decrease in the secondary pressure Psec (SEC pressure) is detected during the travel. If YES (it is judged that the decrease in the secondary pressure Psec is detected during the travel), the routine proceeds to step S2. If NO (it is judged that the decrease in the secondary pressure Psec is not detected during the travel), the routine proceeds to step S13. Here, if the flag is greater than zero, YES is judged.

Here, with regard to the judgement as to whether or not the decrease in the secondary pressure Psec is detected during the travel, in a case where the following two conditions are satisfied, "YES" is judged. First, one condition is a case where a value obtained by subtracting an actual pressure from a command oil pressure is a threshold value or greater (the command oil pressure–the actual pressure the threshold value). The actual pressure is inputted from the secondary pressure sensor 17. The threshold value is a value that is set with consideration given to an allowable control margin etc. The other condition is a case where the actual pressure falls below a required pressure that can transmit power without occurrence of slip of the belt-type continuously variable transmission CVT. The required pressure is previously determined by experiment etc.

At step S2, subsequent to the judgement of "the decrease in the secondary pressure Psec is detected during the travel" at step S1, a judgment is made as to whether or not the flag is 3. If YES (F=3), the routine proceeds to step S12. If NO (F 3), the routine proceeds to step S3.

At step S3, subsequent to the judgement of "F≠3" at step S2, a judgment is made as to whether or not the flag is 2. If YES (F=2), the routine proceeds to step S10. If NO (F≠2), the routine proceeds to step S4.

At step S4, subsequent to the judgement of "F≠2" at step S3, a judgment is made as to whether or not the flag is 1. If YES (F=1), the routine proceeds to step S7. If NO (F≠1), the routine proceeds to step S5.

At step S5, subsequent to the judgement of "F≠1" (i.e. F=0) at step S4, the during-travel abnormality control (a kick charge, an abnormality control) is carried out, then the routine proceeds to step S6.

Here, the during-travel abnormality control is a control that controls the current command value I as shown in FIG. 3. That is, the current command value I is up-and-down-controlled.

FIG. 3 will be explained. Time t1 is a time at which the control at step S5 is started. At time t1, the current command value I is lowered from an initial current (a present current) to a constant (a value of a minimum region). Next, at time t2, the current command value I is raised from the constant to the initial current (time period t1 to t3 is one cycle (a charge current cycle)). Next, for time period t3 to t5, the current command value I is changed likewise in one cycle. When lowering the current command value I from the initial current to the constant (the value of the minimum region) in these changes of the current command value I, the solenoid pressure Psol and the line pressure PL are increased from initial pressure values (values when the current command value I is the initial current) to values of a maximum region respectively. And, when raising the current command value I from the constant to the initial current, the solenoid pressure Psol and the line pressure PL are decreased from the values of the maximum region to the initial pressure values respectively. That is, when the solenoid pressure Psol and the line pressure PL are increased from the initial pressure values to the values of the maximum region respectively, the line pressure spool valve 42 is operated with a movement distance of the line pressure spool valve 42 in the A direction being a value of a maximum region. In this manner, by switching a movement direction of the line pressure spool valve 42 between the A direction and the B direction, the line pressure spool valve 42 is repeatedly operated or actuated forcibly. Next, for time period t5 to t6 (a charge interval), the current command value I is set to the initial current. During this time period, it is ascertained whether an influence such as a shift shock occurs due to the change of the line pressure PL. Next, for time period t6 to t11, the current command value I is changed in the same manner as time period t1 to t6.

Here, the constant is previously determined from the movement distance etc. of the line pressure spool valve 42 by experiment etc. Further, time period t1 to t6 is one set, and time period t1 to t11 takes e.g. about 10 sec.

At step S6, subsequent to execution of the during-travel abnormality control at step S5, the flag is set to 1 (F=1) from zero, and the routine proceeds to step S1.

At step S7, subsequent to the judgement of "F=1" at step S4, a judgment is made as to whether or not the vehicle stops (the vehicle is in a vehicle stop state). If YES (the vehicle stops), the routine proceeds to step S8. If NO (the vehicle is travelling), the routine proceeds to step S1.

Here, the judgement as to whether or not the vehicle stops is made from a range position (a D-range position, an R-range position, an N-range position and an L-range position etc.) inputted from the inhibitor switch 11 and/or a vehicle speed inputted from the vehicle speed sensor 15.

At step S8, subsequent to the judgement of "the vehicle stops (the vehicle is in the vehicle stop state)" at step S7, the during-vehicle stop abnormality control (a clean charge, an abnormality control) is carried out, then the routine proceeds to step S9.

Here, the during-vehicle stop abnormality control is a control that controls the current command value I as shown in FIG. 4. That is, the current command value I is up-and-down-controlled.

FIG. 4 will be explained. Time t21 is a time at which the control at step S8 is started. At time t21, the current command value I is raised from an initial current (a present current) to a maximum value (MAX, a value of a maximum region, e.g. 1 A). Next, at time t22, the current command value I is lowered from the maximum value to a minimum value (a value of a minimum region, 0 A). Next, at time t23, the current command value I is raised from zero to the initial current (time period t21 to t23 is one cycle (a charge current cycle)). Next, for time period t23 to t25, the current command value I is raised likewise from the initial current to the maximum value, lowered likewise from the maximum value to the minimum value and raised likewise from the minimum value to the initial current. When raising the current command value I to the maximum value in these changes of the current command value I, the solenoid pressure Psol and the line pressure PL are decreased to minimum values (values of a minimum region). And, when lowering the current command value I to the minimum value, the solenoid pressure Psol and the line pressure PL are maximum values (values of a maximum region). That is, when the solenoid pressure Psol and the line pressure PL are decreased to the minimum values respectively, the movement distance of the line pressure spool valve 42 in the B direction is a maximum value (a value of a maximum region). On the other hand, when the solenoid pressure Psol and the line pressure PL are increased to the maximum values respectively, the movement distance of the line pressure spool valve 42 in the A direction is a maximum value (a value of a maximum region). In other words, the movement distances (operation distances) of the line pressure spool valve 42 in both directions of A and B directions are the maximum values (the values of the maximum regions). Therefore, the line pressure spool valve 42 can be moved at a full-stroke. In this manner, by switching the movement direction of the line pressure spool valve 42 between the A direction and the B direction, the line pressure spool valve 42 is repeatedly operated or actuated forcibly. Next, for time period t25 to t26 (a charge interval), the current command value I is set to the initial current. During this time period, it is ascertained whether an influence such as the shift shock occurs due to the change of the line pressure PL. Next, for time period t26 to t31, the current command value I is changed in the same manner as time period t21 to t26. Here, time period t21 to t26 is one set, and time period t21 to t31 takes e.g. about 10 sec.

At step S9, subsequent to execution of the during-vehicle stop abnormality control at step S8, the flag is set to 2 (F=2) from 1, and the routine proceeds to step S1.

At step S10, subsequent to the judgement of "F=2" at step S3, the during-travel abnormality control (the kick charge, the abnormality control) is carried out, then the routine proceeds to step S11. Since the during-travel abnormality control is the same as the during-travel abnormality control at step S5, its explanation will be omitted here.

At step S11, subsequent to execution of the during-travel abnormality control at step S10, the flag is set to 3 (F=3) from 2, and the routine proceeds to step S1.

At step S12, subsequent to the judgement of "F=3" at step S2, it is determined (judged) that the decrease in the secondary pressure Psec during the travel is caused by abnormality (failure), and a failure code (a DTC code) is outputted (or set), then the routine proceeds to END. Here, regarding "the failure code is outputted", for instance, the failure code is indicated by a symbol (a sign) or an identifying mark on a vehicle information indicator on which a tachometer is indicated. When repair is carried out, the failure code is not outputted, and the flag is reset from 3 to zero.

At step S13, subsequent to the judgement of "the decrease in the secondary pressure Psec is not detected during the travel", the flag is reset to zero, and the routine proceeds to step S1.

Next, operation, working and feature will be explained. Operation, working and feature of the pressure regulation valve control device according to the embodiment 1 will be separately explained by [Operation of abnormality control], [Working of abnormality control] and [Feature of pressure regulation valve control device].

[Operation of Abnormality Control]

Operation of the abnormality control of the embodiment 1 will be explained on the basis of the flow chart shown in FIG. 2.

When judged that the decrease in the secondary pressure Psec is not detected during the travel, in the flow chart in FIG. 2, the routine proceeds from "NO" at step S1 to step S13, and the flag is reset to zero at step S13. When judged to be "NO" at step S1, a flow from "NO" at step S1→step S13 is repeated.

When judged that, at "F=0" (in a state in which the secondary pressure Psec is not detected during the travel), the decrease in the secondary pressure Psec is detected during the travel, in the flow chart in FIG. 2, the routine proceeds in an order of "YES" at step S1→"NO" at step S2→"NO" at step S3→"NO" at step S4→step S5. At step S5, the during-travel abnormality control is carried out. Then, the routine proceeds in an order of step S5→step S6. At step S6, the flag is set to 1, and the routine proceeds from step S6 to step S1.

Next, when judged that the decrease in the secondary pressure Psec is detected during the travel even after the execution of the during-travel abnormality control at step S5, in the flow chart in FIG. 2, the routine proceeds in an order of "YES" at step S1→"NO" at step S2→"NO" at step S3→"YES" at step S4→step S7. At step S7, when judged that the vehicle is travelling, the routine proceeds from "NO" at step S7 to step S1. And, a flow of "YES" at step S1→"NO" at step S2→"NO" at step S3→"YES" at step S4→"NO" at step S7 is repeated. Then, when judged that the vehicle stops at step S7, the routine proceeds from "YES" at step S7 to step S8. At step S8, the during-vehicle stop abnormality control is carried out. Then, the routine proceeds in an order of step S8→step S9. At step S9, the flag is set to 2 from 1, and the routine proceeds from step S9 to step S1.

Next, when judged that the decrease in the secondary pressure Psec is detected during the travel even after the execution of the during-travel abnormality control at step S5 and the execution of the during-vehicle stop abnormality control at step S8, in the flow chart in FIG. 2, the routine proceeds in an order of "YES" at step S1→"NO" at step S2→"YES" at step S3→step S10. At step S10, the during-travel abnormality control, which is the same as the during-travel abnormality control at step S5, is carried out. Then, the routine proceeds in an order of step S10→step S11. At step S11, the flag is set to 3 from 2, and the routine proceeds from step S11 to step S1.

Subsequently, when judged that the decrease in the secondary pressure Psec is detected during the travel even after the execution of the abnormality controls at steps S5 and S8 and the execution of the during-travel abnormality control at step S10, in the flow chart in FIG. 2, the routine proceeds in an order of "YES" at step S1→"YES" at step S2→step S12. At step S12, it is judged that the decrease in the secondary pressure Psec during the travel is caused by failure, and the failure code is outputted. Then, the routine proceeds from step S12 to END.

Here, when judged that, after the execution of the during-travel abnormality control at step S5, or after the execution of the during-vehicle stop abnormality control at step S8, or after the execution of the during-travel abnormality control at step S10, the decrease in the secondary pressure Psec is not detected during the travel at step S1, the routine proceeds from "NO" at step S1 to step S13, and the flag is reset to zero at step S13. And, when judged to be "NO" at step S1, a flow from "NO" at step S1→step S13 is repeated. That is, when "NO" at step S1 is judged after the execution of the abnormality control, this means that an abnormal state that is a reversible failure caused by contamination is returned or recovers to a normal state.

[Working of Abnormality Control]

Figure 5:
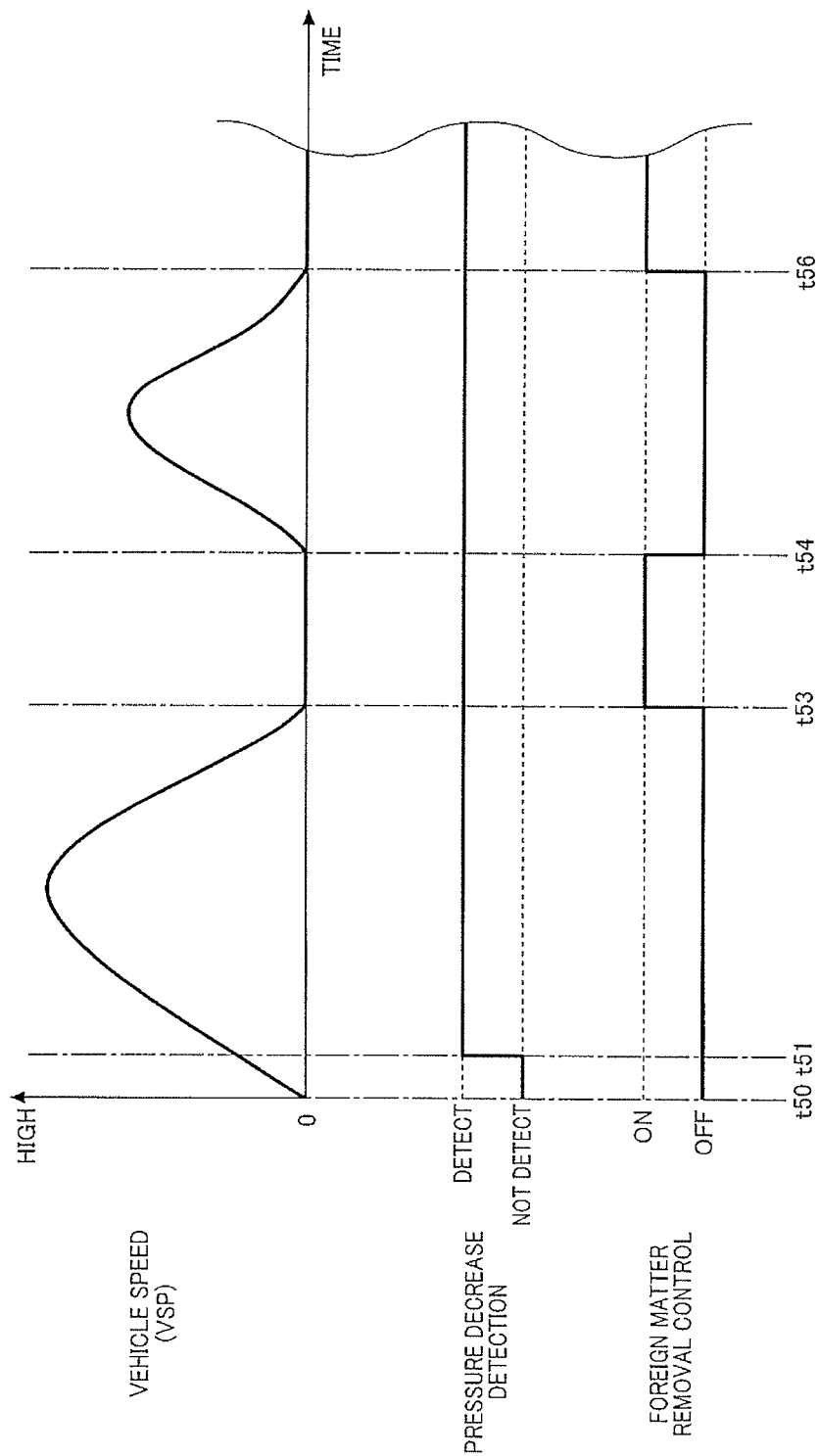
FIG. 5 is an example of operation of a foreign matter removal control of a comparative example, showing time charts of vehicle speed, detection of oil pressure decrease and the foreign matter removal control in a foreign matter removal control device of the comparative example.
Figure 6:
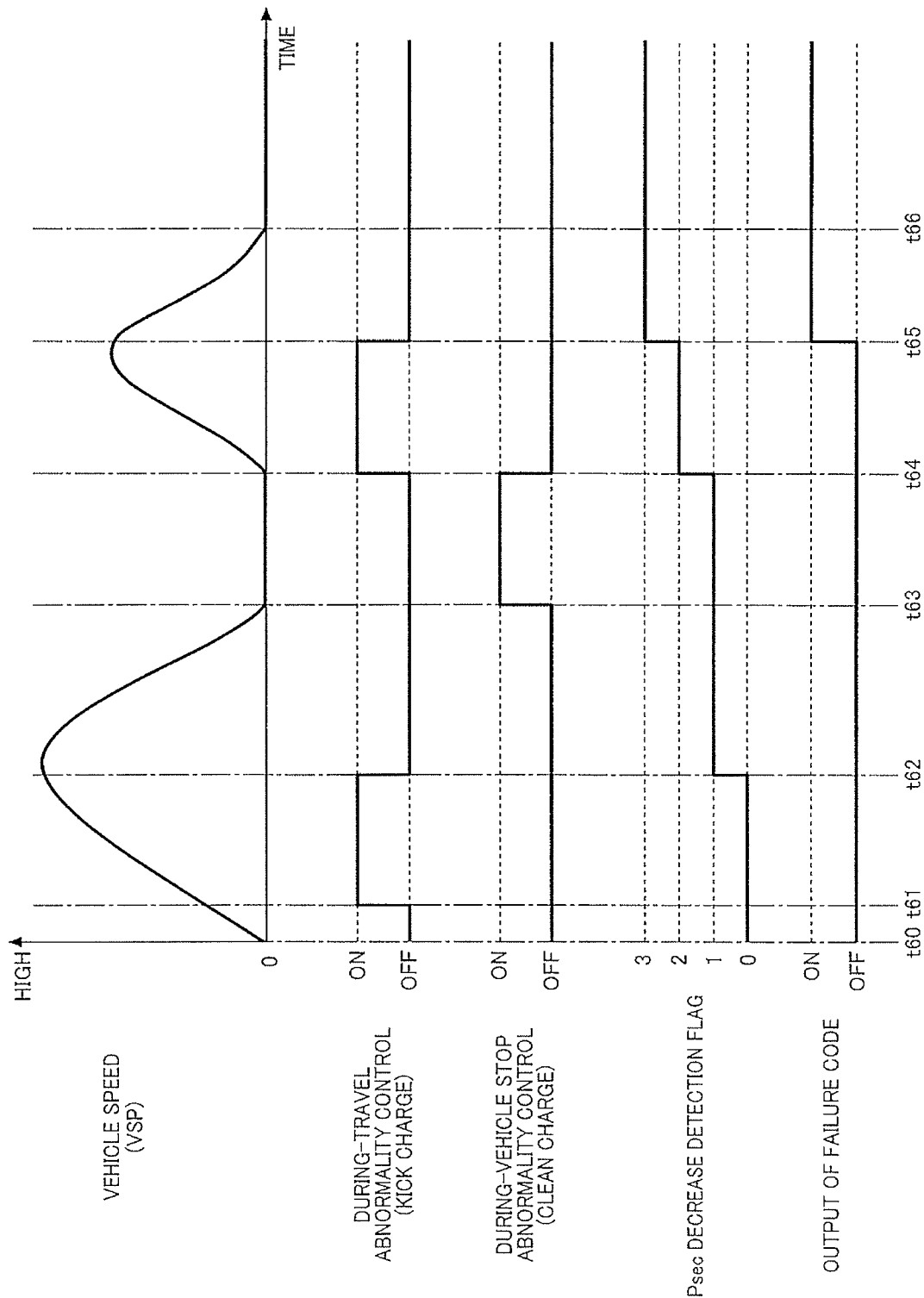
FIG. 6 is an example of the operation of the abnormality control of the embodiment 1, showing time charts of vehicle speed, the during-travel abnormality control, the during-vehicle stop abnormality control, a secondary pressure Psec decrease detection flag and an output of a failure code in the abnormality control unit of the embodiment 1.

FIG. 5 is an example of operation of a foreign matter removal control of a comparative example. FIG. 6 is an example of the operation of the abnormality control of the embodiment 1. In the following description, first, the example of the operation of the foreign matter removal control of the comparative example will be explained. And second, the example of the operation of the abnormality control of the embodiment 1 will be explained. Further, each step of the configuration of the abnormality control operation will be explained on the basis of time charts shown in FIG. 6.

(Example of Operation of Foreign Matter Removal Control of Comparative Example)

A control device of the vehicle of the comparative example controls an oil pressure supplied to a clutch by a pressure regulation valve. When decrease in a clutch pressure (the oil pressure) controlled by this pressure regulation valve is detected during travel or during vehicle stop, the control device of the vehicle changes a signal pressure to the pressure regulation valve from a solenoid and moves a spool valve provided inside the pressure regulation valve (a foreign matter removal control) in a vehicle stop state (during the vehicle stop). The foreign matter removal control in this vehicle stop state will be explained below on the basis of time charts shown in FIG. 5.

At time t50, the vehicle starts to travel from the vehicle stop state. At this time t50 and for time period t50 to t51, the decrease in the clutch pressure is not detected.

At time t51, the decrease in the clutch pressure is detected during the travel. However, in the comparative example, the foreign matter removal control is not carried out during the travel. Further, since the vehicle is travelling for time period t51 to t53, the foreign matter removal control is not carried out for time period t51 to t53. Because of this, it is not possible to prevent the decrease in the clutch pressure during the travel.

At time t53, the vehicle stops, and the foreign matter removal control is started. Further, the foreign matter removal control is carried out for time period t53 to t54.

At time t54, the foreign matter removal control is ended, and the vehicle travel starts. Then, the decrease in the clutch pressure is detected during the travel. In the same manner as time period t51 to t53, since the vehicle is travelling for time period t54 to t56, the foreign matter removal control is not carried out for time period t54 to t56.

At time t56, the vehicle stops, and the foreign matter removal control is started again. Further, after time t56, in the same manner as time period t53 to t54, the foreign matter removal control is carried out. That is, in the comparative example, when detecting the decrease in the clutch pressure, the foreign matter removal control is not carried out during the travel, but is carried out during the vehicle stop.

As described above, in the comparative example, the foreign matter removal control, i.e. movement of the spool valve, is executed in the vehicle stop state. Because of this, an operation direction (a movement direction) of the spool valve could be a side where the clutch pressure is decreased or a side where the clutch pressure is increased. With this operation or movement, contamination trapped in the pressure regulation valve can be drained or removed. The reason why the foreign matter removal control is carried out in the vehicle stop state like the comparative example is because, for instance, even if the clutch is disengaged due to the decrease in the clutch pressure, or even if a clutch surface pressure is excessive due to increase in the clutch pressure, there is no influence on the vehicle travel.

(Example of Operation of Abnormality Control of Embodiment 1)

Next, the example of the operation of the abnormality control of the embodiment 1 will be explained on the basis of the time charts shown in FIG. 6.

At time t60, the vehicle starts to travel from the vehicle stop state. For instance, at this time t60, the flow chart of FIG. 2 starts. At this time t60 and for time period t60 to t61, as shown in FIG. 6, the decrease in the secondary pressure Psec is not detected during the travel. At this time t60 and for time period t60 to t61, the flag is "F=0", and this corresponds to the repetition of the flow from "NO" at step S1→step S13 in the flow chart in FIG. 2.

At time t61, it is judged that, at "F=0", the decrease in the secondary pressure Psec is detected during the travel. Because of this, the during-travel abnormality control is started at time t61, and is carried out for time period t61 to t62. This time t61 corresponds to the flow of "YES" at step S1→"NO" at step S2→"NO" at step S3→"NO" at step S4→step S5 in the flow chart in FIG. 2. The time period t61 to t62 corresponds to step S5 in the flow chart in FIG. 2.

At time t62, the during-travel abnormality control is ended, and the flag is set to 1 from zero. Then, during the progress of the vehicle travel, it is judged again that, at "F=1", the decrease in the secondary pressure Psec is detected during the travel. This time t62 corresponds to the flow of step S5→step S6→"YES" at step S1→"NO" at step S2→"NO" at step S3→"YES" at step S4→"NO" at step S7 in the flow chart in FIG. 2. Time period t62 to t63 is time period for which the vehicle travel is in progress. Thus, the time period t62 to t63 corresponds to the repetition of the flow of "YES" at step S1→"NO" at step S2→"NO" at step S3→"YES" at step S4→"NO" at step S7 in the flow chart in FIG. 2.

At time t63, since the vehicle stops and it has been judged that the decrease in the secondary pressure Psec is detected during the travel, the during-vehicle stop abnormality control is started. Then, for time period t63 to t64, the during-vehicle stop abnormality control is carried out. This time t63 corresponds to the flow of "YES" at step S1→"NO" at step S2→"NO" at step S3→"YES" at step S4→"YES" at step S7→step S8 in the flow chart in FIG. 2. The time period t63 to t64 corresponds to step S8 in the flow chart in FIG. 2.

At time t64, the during-vehicle stop abnormality control is ended, the vehicle travel starts, and the flag is set to 2 from 1. Then, during the progress of the vehicle travel, it is judged again that, at "F=2", the decrease in the secondary pressure Psec is detected during the travel. Because of this, the during-travel abnormality control is started at time t64, and is carried out for time period t64 to t65. This time t64 corresponds to the flow of step S8→step S9→"YES" at step S1→"NO" at step S2→"YES" at step S3→step S10 in the flow chart in FIG. 2. The time period t64 to t65 corresponds to step S10 in the flow chart in FIG. 2.

At time t65, the during-travel abnormality control is ended, and the flag is set to 3 from 2. Then, during the progress of the vehicle travel, it is judged again that, at "F=3", the decrease in the secondary pressure Psec is detected during the travel. Because of this, it is judged that the decrease in the secondary pressure Psec during the travel is caused by failure, and the failure code is outputted at time t65. This time t65 corresponds to the flow of step S10→step S11→"YES" at step S1→"YES" at step S2→step S12→END in the flow chart in FIG. 2. Here, by the fact that the failure code is outputted, in the example of the operation in FIG. 6, after time t65, the during-travel/during-vehicle stop abnormality controls are not carried out, even when the vehicle is travelling, and even when the vehicle stops at time t66.

As described above, unlike the foreign matter removal control of the comparative example, the abnormality control of the embodiment 1 is carried out during the travel. Therefore, even in the case where the decrease in the secondary pressure Psec is detected during the travel, it is possible, during the travel, to increase the solenoid pressure Psol more than the solenoid pressure Psol of a time when the decrease in the secondary pressure Psec is detected. With this operation, the abnormality control of the embodiment 1 can suppress the decrease in the secondary pressure Psec during the travel. Further, in the abnormality control of the embodiment 1, unlike the foreign matter removal control of the comparative example, by switching the movement direction of the line pressure spool valve 42 between the A direction and the B direction (a direction to an initial position) during the travel, the line pressure spool valve 42 is repeatedly moved or operated. This movement or operation facilitates the draining or removal of the contamination during the travel.

[Feature of Pressure Regulation Valve Control Device]

The control device of the vehicle of the comparative example drains or removes the contamination in the vehicle stop state by moving the spool valve (for time period t53 to t54 in FIG. 5). For this reason, for instance, in a case where the clutch pressure decreases due to the trap of the contamination in the pressure regulation valve during the travel, the decrease in the clutch pressure during the travel cannot be prevented during the travel. On the other hand, if the foreign matter removal control of the comparative example is carried out during the travel, for instance, in a case where the spool valve is moved to a side where a discharge pressure of the pressure regulation valve is decreased, an oil pressure at a downstream side with respect to the pressure regulation valve is decreased, and this affects a vehicle travelling state, such as insufficient oil pressure supply to the clutch or a belt etc. As described above, the control device of the vehicle of the comparative example has a problem of not being able to prevent the decrease in the clutch pressure during the travel without affecting the vehicle travelling state when the clutch pressure decreases during the travel.

In contrast to this, in the embodiment 1, the abnormality control unit 81 (FIGS. 2, 3 and 6) is configured to, when the decrease in the secondary pressure Psec is detected during the travel (at step S1 in FIG. 2 and at time t61 etc. in FIG. 6), execute, during the travel, the abnormality control that increases the solenoid pressure Psol, supplied to the line pressure spool valve 42 from the line pressure solenoid 41, more than the solenoid pressure Psol of the time when the decrease in the secondary pressure Psec is detected (at steps S5 and S10 in FIG. 2, for time periods t1 to t2, t3 to t4, t6 to t7 and t8 to t9 in FIG. 3 and time periods t61 to t62 and t64 to t65 in FIG. 6).

That is, even when the decrease in the secondary pressure Psec is detected during the travel, since the solenoid pressure Psol is increased, during the travel, more than the solenoid pressure Psol of the time when the decrease in the secondary pressure Psec is detected, the line pressure spool valve 42 is moved in the A direction. With this movement, since the secondary pressure Psec is increased, it is possible to suppress decrease in an oil pressure (e.g. the primary pressure Ppri etc.) at a downstream side with respect to the line pressure regulation valve 4. This thus suppresses an influence on the vehicle travelling state which is caused by the decrease in the oil pressure (e.g. the primary pressure Ppri etc.) in other portion or unit.

Consequently, even when the decrease in the secondary pressure Psec is detected during the travel, the decrease in the secondary pressure Psec is suppressed during the travel while reducing the influence on the vehicle travel. In addition, even when the decrease in the secondary pressure Psec is detected during the travel, since the solenoid pressure Psol is increased, during the travel, more than the solenoid pressure Psol of the time when the decrease in the secondary pressure Psec is detected, it is possible to drain or remove the contamination trapped in the line pressure regulation valve 4.

In the embodiment 1, the abnormality control unit 81 (FIGS. 2, 3 and 6) is configured to bring the solenoid pressure Psol, supplied to the line pressure spool valve 42 from the line pressure solenoid 41, to the value of the maximum region (at steps S5 and S10 in FIG. 2, for time periods t1 to t2, t3 to t4, t6 to t7 and t8 to t9 in FIG. 3 and time periods t61 to t62 and t64 to t65 in FIG. 6).

That is, since the solenoid pressure Psol becomes the value of the maximum region, the movement distance of the line pressure spool valve 42 in the A direction becomes the value of the maximum region.

As a consequence, the contamination trapped in the line pressure regulation valve 4 can be surely drained or removed during the travel. Furthermore, even when the solenoid pressure Psol, supplied to the line pressure spool valve 42, becomes the value of the maximum region, it is possible to suppress the influence on the vehicle travelling state without decrease in the oil pressure (e.g. the primary pressure Ppri etc.) at the downstream side with respect to the line pressure regulation valve 4.

In the embodiment 1, the abnormality control unit 81 (FIGS. 2, 3 and 6) is configured to repeat the increase and decrease of the solenoid pressure Psol supplied to the line pressure spool valve 42 from the line pressure solenoid 41 during the travel (for time periods t1 to t5 and t6 to t10 in FIG. 3).

That is, the movement direction of the line pressure spool valve 42 is switched between the A direction and the B direction (a direction returning to the initial position), and the line pressure spool valve 42 is repeatedly moved or operated.

Therefore, this movement or operation further facilitates the draining or removal of the contamination during the travel.

In the embodiment 1, the abnormality control unit 81 (FIGS. 2, 4 and 6) is configured to, when the decrease in the secondary pressure Psec controlled by the line pressure regulation valve 4 is detected (at step S1 in FIG. 2 and at time t62 in FIG. 6) after the execution of the abnormality control during the travel (after step S5 in FIG. 2 and after time period t61 to t62 in FIG. 6), decrease the solenoid pressure Psol supplied to the line pressure spool valve 42 from the line pressure solenoid 41 more than the solenoid pressure Psol of the time when the decrease in the secondary pressure Psec is detected (at step S8 in FIG. 2, for time periods t21 to t22, t23 to t24, t26 to t27 and t28 to t29 in FIG. 4 and for time period t63 to t64 in FIG. 6), in the vehicle stop state.

That is, during the travel, since there is a slight risk of affecting the vehicle travelling state, it might be impossible to decrease the solenoid pressure Psol more than the solenoid pressure Psol of the time when the decrease in the secondary pressure Psec is detected.

Therefore, in the vehicle stop state in which influence on the vehicle travelling state is small, the solenoid pressure Psol is decreased more than the solenoid pressure Psol of the time when the decrease in the secondary pressure Psec is detected. Then, the line pressure spool valve 42 is moved to a region (a region in the B direction with respect to the initial position) where the line pressure spool valve 42 cannot be moved during the travel.

It is therefore possible, in the vehicle stop state, to drain or remove the contamination that cannot be drained by the movement of the line pressure spool valve 42 in the A direction during the travel.

In the embodiment 1, the abnormality control unit 81 (FIGS. 2, 4 and 6) is configured to bring the solenoid pressure Psol, supplied to the line pressure spool valve 42 from the line pressure solenoid 41, to the value of the minimum region (at step S8 in FIG. 2, for time periods t21 to t22, t23 to t24, t26 to t27 and t28 to t29 in FIG. 4 and time period t63 to t64 in FIG. 6).

That is, since the solenoid pressure Psol becomes the value of the minimum region, the movement distance of the line pressure spool valve 42 in the B direction becomes the value of the maximum region.

As a consequence, the contamination trapped in the line pressure regulation valve 4 can be surely drained or removed in the vehicle stop state.

In the embodiment 1, the abnormality control unit 81 (FIGS. 2, 4 and 6) is configured to repeat the increase and decrease of the solenoid pressure Psol supplied to the line pressure spool valve 42 from the line pressure solenoid 41 in the vehicle stop state (for time periods t21 to t25 and t26 to t30 in FIG. 4).

That is, the movement direction of the line pressure spool valve 42 is switched between the A direction and the B direction, and the line pressure spool valve 42 is repeatedly moved or operated.

Therefore, this movement or operation further facilitates the draining or removal of the contamination in the vehicle stop state.

In the embodiment 1, the abnormality control unit 81 (FIGS. 2 and 6) is configured to, when the decrease in the secondary pressure Psec controlled by the line pressure regulation valve 4 is detected (at step S1 in FIG. 2 and at time t65 in FIG. 6) after the execution of the during-vehicle stop abnormality control that decreases the solenoid pressure Psol supplied to the line pressure spool valve 42 from the line pressure solenoid 41 in the vehicle stop state (after step S8 in FIG. 2 and after time period t63 to t64 in FIG. 6), judge the decrease in the secondary pressure Psec to be failure (at step S12 in FIG. 2 and at time t65 in FIG. 6).

That is, it is judged that a cause of the decrease in the secondary pressure Psec is not due to the contamination trapped in the line pressure regulation valve 4.

The decrease in the secondary pressure Psec is thus judged to be failure. In addition, since the failure code is outputted, an analysis of the cause can be facilitated as compared with a case where the failure code is not outputted.

In the embodiment 1, the pressure regulation valve is the line pressure regulation valve 4 provided in the hydraulic pressure control valve unit 3 of the belt-type continuously variable transmission CVT. This line pressure regulation valve 4 has the line pressure solenoid 41 and the line pressure spool valve 42. Further, the secondary pulley Sec is provided with the line pressure PL regulated by the line pressure regulation valve 4 being the secondary pressure Psec. And, the abnormality control unit 81 (FIG. 1) is configured to, when the decrease in the secondary pressure Psec of the secondary pulley Sec is detected, control the line pressure regulation valve 4.

That is, by controlling the line pressure regulation valve 4, even in the case where the decrease in the secondary pressure Psec is detected, the decrease in the secondary pressure Psec is suppressed.

Therefore, in addition to the suppression of the decrease in the secondary pressure Psec, decrease in the oil pressure at the downstream side with respect to the line pressure regulation valve 4 is also suppressed.

Next, effects will be explained. The pressure regulation valve control device according to the embodiment 1 can obtain the following effects.

(1) A pressure regulation valve control device comprises: a pressure regulation valve (a line pressure regulation valve 4) having a solenoid (a line pressure solenoid 41) and a spool valve (a line pressure spool valve 42); and a controller (a CVT control unit 8) configured to control an oil pressure (a secondary pressure Psec) by actuating the spool valve (the line pressure spool valve 42) by a command pressure (a solenoid pressure Psol) that is produced by controlling a current command value I to the solenoid (the line pressure solenoid 41), and the controller (the CVT control unit 8) has an abnormality control unit (81) configured to, when decrease in the oil pressure (the secondary pressure Psec) is detected during travel, execute, during the travel, abnormality control that increases the command pressure (the solenoid pressure Psol) supplied to the spool valve (the line pressure spool valve 42) from the solenoid (the line pressure solenoid 41) more than a command pressure (a solenoid pressure Psol) of a time when the decrease in the oil pressure (the secondary pressure Psec) is detected.

Therefore, it is possible to provide the pressure regulation valve control device that is capable of suppressing the decrease in the oil pressure (the secondary pressure Psec) during the travel while reducing the influence on the vehicle travel even in the case where the decrease in the oil pressure (the secondary pressure Psec) is detected during the travel.

(2) The abnormality control unit (81) is configured to bring the command pressure (the solenoid pressure Psol) supplied to the spool valve (the line pressure spool valve 42) from the solenoid (the line pressure solenoid 41) to a value of a maximum region.

Therefore, in addition to an effect of (1), the contamination trapped in the pressure regulation valve (the line pressure regulation valve 4) can be surely drained or removed during the travel.

(3) The abnormality control unit (81) is configured to repeat increase and decrease of the command pressure (the solenoid pressure Psol) supplied to the spool valve (the line pressure spool valve 42) from the solenoid (the line pressure solenoid 41) during the travel.

Therefore, in addition to effects of (1) and (2), the draining or removal of the contamination is facilitated during the travel.

(4) The abnormality control unit (81) is configured to, when the decrease in the oil pressure (the secondary pressure Psec) controlled by the pressure regulation valve (the line pressure regulation valve 4) is detected after execution of the abnormality control during the travel, decrease the command pressure (the solenoid pressure Psol) supplied to the spool valve (the line pressure spool valve 42) from the solenoid (the line pressure solenoid 41) more than a command pressure (a solenoid pressure Psol) of a time when the decrease in the oil pressure (the secondary pressure Psec) is detected, in a vehicle stop state.

Therefore, in addition to effects of (1) to (3), it is possible, in the vehicle stop state, to drain or remove the contamination that cannot be drained by the movement of the spool valve (the line pressure spool valve 42) in one direction (the A direction) during the travel.

(5) The abnormality control unit (81) is configured to bring the command pressure (the solenoid pressure Psol) supplied to the spool valve (the line pressure spool valve 42) from the solenoid (the line pressure solenoid 41) to a value of a minimum region.

Therefore, in addition to an effect of (4), the contamination trapped in the pressure regulation valve (the line pressure regulation valve 4) can be surely drained or removed in the vehicle stop state.

(6) The abnormality control unit (81) is configured to repeat increase and decrease of the command pressure (the solenoid pressure Psol) supplied to the spool valve (the line pressure spool valve 42) from the solenoid (the line pressure solenoid 41) in the vehicle stop state.

Therefore, in addition to an effects of (4) and (5), the draining or removal of the contamination is facilitated in the vehicle stop state.

(7) The abnormality control unit (81) is configured to, when the decrease in the oil pressure (the secondary pressure Psec) controlled by the pressure regulation valve (the line pressure regulation valve 4) is detected after execution of the abnormality control that decreases the command pressure (the solenoid pressure Psol) supplied to the spool valve (the line pressure spool valve 42) from the solenoid (the line pressure solenoid 41) in the vehicle stop state, judge the decrease in the oil pressure (the secondary pressure Psec) to be failure.

Therefore, in addition to an effects of (4) to (6), the decrease in the oil pressure (the secondary pressure Psec) can be judged to be failure.

(8) The pressure regulation valve is a line pressure regulation valve (4) that is provided in a hydraulic pressure control valve unit (3) of a continuously variable transmission (a belt-type continuously variable transmission CVT), the line pressure regulation valve (4) has a line pressure solenoid (41) and a line pressure spool valve (42), a secondary pulley (Sec) is provided with a line pressure (PL) regulated by the line pressure regulation valve (4) being a secondary pressure (Psec), and the abnormality control unit (81) is configured to, when decrease in the secondary pressure (Psec) of the secondary pulley (Sec) is detected, control the line pressure regulation valve (4).

Therefore, in addition to an effects of (1) to (7), decrease in the oil pressure at the downstream side with respect to the line pressure regulation valve 4 is suppressed.

Although the pressure regulation valve control device according to the present invention have been explained on the basis of the embodiment 1, a specified configuration is not limited to the embodiment 1. The configuration includes all design modifications and equivalents belonging to the technical scope of the present invention.

The embodiment 1 shows the example in which the increase and decrease of the solenoid pressure Psol are repeated in the during-travel abnormality control and in the during-vehicle stop abnormality control. However, the control is not limited to this. For instance, in FIG. 3, the increase and decrease of the solenoid pressure Psol are not repeated, but the current command value I is lowered from the initial current to the constant at time t1, and could be held at the constant for time period t1 to t10. Then, at time t10, the current command value I is returned to the initial current from the constant. That is, the increase of the solenoid pressure Psol could be held for time period t1 to t10.

Further, in FIG. 4, the increase and decrease of the solenoid pressure Psol are not repeated, but the current command value I could be held at the value of the maximum region for time period t21 to t30. Then, at time t30, the current command value I is returned to the initial current from the maximum value. That is, the decrease of the solenoid pressure Psol could be held for time period t21 to t30.

In short, when the decrease in the secondary pressure Psec is detected during the travel, the solenoid pressure Psol is increased more than the solenoid pressure Psol of the time when the decrease in the secondary pressure Psec is detected. Further, when the decrease in the secondary pressure Psec controlled by the line pressure regulation valve 4 is detected, in the vehicle stop state, the solenoid pressure Psol supplied to the line pressure spool valve 42 from the line pressure solenoid 41 is decreased more than the solenoid pressure Psol of the time when the decrease in the secondary pressure Psec is detected.

The embodiment 1 shows the example in which, in the during-travel abnormality control, the current command value I is lowered from the initial current to the constant and the solenoid pressure Psol is increased to the value of the maximum region. However, the control is not limited to this. For instance, the current command value I could be lowered from the initial current to the minimum value (0 A) and the solenoid pressure Psol is increased to the maximum value.

The embodiment 1 shows the example in which, in the during-vehicle stop abnormality control, the current command value I is raised from the initial current to the maximum value and the solenoid pressure Psol is decreased to the minimum value, and also the current command value I is lowered from the maximum value to the minimum value and the solenoid pressure Psol is increased to the maximum value. However, the control is not limited to this. For instance, the current command value I could be raised from the initial current to the value of the maximum region, and the solenoid pressure Psol is decreased to the value of the minimum region. And also, the current command value I could be lowered from the value of the maximum region to the value of the minimum region, and the solenoid pressure Psol is increased to the value of the maximum region.

The embodiment 1 shows the example in which, in the during-travel abnormality control and in the during-vehicle stop abnormality control, the increase and decrease of the solenoid pressure Psol are repeated about two times, and two sets are performed with this repetition of about two times being one set in each of the during-travel abnormality control and the during-vehicle stop abnormality control.

However, the control is not limited to this. For instance, the increase and decrease of the solenoid pressure Psol could be repeated one time or three times or more, and one set or three sets or more could be performed with this repetition of one time or three times or more being one set in each of the during-travel abnormality control and the during-vehicle stop abnormality control.

The embodiment 1 shows the example in which the during-travel abnormality control is carried out before and after the during-vehicle stop abnormality control. However, the control is not limited to this. For instance, the during-travel abnormality control is not carried out after the execution of the during-vehicle stop abnormality control.

The embodiment 1 shows the example in which the pressure, the decrease of which is detected, is the secondary pressure Psec. However, the pressure whose decrease is detected is not limited to this. For instance, the pressure whose decrease is detected could be the primary pressure Ppri. In this case, the abnormality control unit 81 is configured to abnormality-control both of the line pressure regulation valve 4 and the primary pressure regulation valve 5 which regulate the primary pressure Ppri. In short, the abnormality control unit 81 is configured to abnormality-control all of upstream-side pressure regulation valves that regulate the pressure whose decrease is detected.

The embodiment 1 shows the example in which the pressure regulation valve is the line pressure regulation valve 4 that regulates the line pressure PL. However, the pressure regulation valve is not limited to this. For instance, the pressure regulation valve could be each of the pressure regulation valves that regulate the primary pressure Ppri, the secondary pressure Psec, the pilot pressure Pp, the clutch pressure and the brake pressure respectively.

The embodiment 1 shows the example in which the pressure regulation system is the single pressure regulation system in which the secondary pressure Psec is the line pressure PL. However, the pressure regulation system is not limited to this. For instance, the pressure regulation system could be a dual pressure regulation system in which the primary pressure Ppri and the secondary pressure Psec are regulated. In short, the secondary pressure regulation valve could be provide, like the primary pressure regulation valve 5.

The embodiment 1 shows the example in which the pressure regulation valve control device according to the present invention is applied to the belt-type continuously variable transmission CVT having the hydraulic pressure control valve unit 3. However, the pressure regulation valve control device according to the present invention can be applied to an automatic transmission called a step-AT having a hydraulic pressure control valve unit and other continuously variable transmissions. In short, the pressure regulation valve control device according to the present invention can be applied to a hydraulic device having the pressure regulation valve. For instance, the pressure regulation valve control device according to the present invention can be applied to a 4WD (four-wheel drive) clutch and an LSD (Limited Slip Differential) clutch each provided in a drive line, and so on.

The embodiment 1 shows the example in which assuming that the decrease in the secondary pressure Psec due to the contamination is detected, by draining or removing the contamination by and according to the solenoid pressure Psol, the actual pressure of the secondary pressure Psec is increased. However, a purpose of the increase and decrease of the solenoid pressure Psol supplied to the spool valve in the abnormality control of the present invention is to move the spool valve provided inside the pressure regulation valve. And thus, there is no need to increase and decrease the actual pressure of the oil pressure (e.g. the line pressure, the secondary pressure, the primary pressure, the clutch pressure and the brake pressure) regulated by the pressure regulation valve. Increase and decrease of the actual pressure of the oil pressure regulated by the pressure regulation valve, which result from the execution of the abnormality control of the present invention, are acceptable.

The invention claimed is:

1. A pressure regulation valve control device comprising:
a pressure regulation valve having a solenoid and a spool valve; and
a controller configured to control an oil pressure by actuating the spool valve by a command pressure that is produced by controlling a current command value to the solenoid, and
the controller having an abnormality control unit configured to, when decrease in the oil pressure is detected during travel, execute, during the travel, abnormality control that forcibly actuates the spool valve by increasing the command pressure supplied to the spool valve form the solenoid more than a command pressure of a time when the decrease in the oil pressure is detected.

2. The pressure regulation valve control device as claimed in claim 1, wherein: the abnormality control unit is configured to bring the command pressure supplied to the spool valve from the solenoid to a value of a maximum region.

3. The pressure regulation valve control device as claimed in claim 1, wherein:
the abnormality control unit is configured to repeat increase and decrease of the command pressure supplied to the spool valve from the solenoid during the travel.

4. The pressure regulation valve control device as claimed in claim 1, wherein:
the abnormality control unit is configured to, when the decrease in the oil pressure controlled by the pressure regulation valve is detected after execution of the abnormality control during the travel, decrease the command pressure supplied to the spool valve from the solenoid more than a command pressure of a time when the decrease in the oil pressure is detected, in a vehicle stop state.

5. The pressure regulation valve control device as claimed in claim 4, wherein: the abnormality control unit is configured to bring the command pressure supplied to the spool valve from the solenoid to a value of a minimum region.

6. The pressure regulation valve control device as claimed in claim 4, wherein:
the abnormality control unit is configured to repeat increase and decrease of the command pressure supplied to the spool valve from the solenoid in the vehicle stop state.

7. The pressure regulation valve control device as claimed in claim 4, wherein:
the abnormality control unit is configured to, when the decrease in the oil pressure controlled by the pressure regulation valve is detected after execution of the abnormality control that decreases the command pressure supplied to the spool valve from the solenoid in the vehicle stop state, judge the decrease in the oil pressure to be failure.

8. The pressure regulation valve control device as claimed in claim 1, wherein:

the pressure regulation valve is a line pressure regulation valve that is provided in a hydraulic pressure control valve unit of a continuously variable transmission, the line pressure regulation valve has a line pressure solenoid and a line pressure spool valve, a secondary pulley is provided with a line pressure regulated by the line pressure regulation valve being a secondary pressure, and the abnormality control unit is configured to, when decrease in the secondary pressure of the secondary pulley is detected, control the line pressure regulation valve.

* * * * *